United States Patent [19]

Agahi-Kesheh et al.

[11] Patent Number: 5,513,382
[45] Date of Patent: Apr. 30, 1996

[54] MULTI-CERAMIC LAYER SWITCH CIRCUIT

[75] Inventors: Darioush Agahi-Kesheh, Mundelein, Ill.; Rong-Fong Huang; Richard S. Kommrusch, both of Alburquerque, N.M.

[73] Assignee: Motorola, Inc., Schaumburg, Ill.

[21] Appl. No.: 407,787

[22] Filed: Mar. 20, 1995

Related U.S. Application Data

[63] Continuation of Ser. No. 40,780, Mar. 31, 1993, abandoned.

[51] Int. Cl.$^6$ ................................................. H04B 1/44
[52] U.S. Cl. ............................. 455/83; 455/82; 333/103; 333/104; 333/246
[58] Field of Search ............................... 455/78, 80, 82, 455/83, 84; 333/103, 104, 262, 246, 204, 202

[56] References Cited

U.S. PATENT DOCUMENTS

| | | | |
|---|---|---|---|
| 3,475,700 | 10/1969 | Ertel | 455/83 |
| 4,701,724 | 10/1987 | Martin | 333/103 |
| 5,023,935 | 6/1991 | Vancraeynest | 455/80 |

FOREIGN PATENT DOCUMENTS

| | | | |
|---|---|---|---|
| 0578160A1 | 1/1994 | European Pat. Off. | |
| 2855173B1 | 2/1980 | Germany | |
| 128001 | 10/1981 | Japan | 33/246 |
| 172501 | 7/1988 | Japan | 333/104 |
| 2273821 | 6/1994 | United Kingdom | |

OTHER PUBLICATIONS

Wallington, J. R., "Microstrip switching using P–I–N diodes", GEC Journal of Science and Technology, vol. 43, No. 3, 1977.

Unitrode Corporation Databook, copyright 1984, pp. 49–53.

*Primary Examiner*—Reinhard J. Eisenzopf
*Assistant Examiner*—Thanh Le
*Attorney, Agent, or Firm*—Daniel W. Juffernbruch

[57] ABSTRACT

A switch circuit for a cellular radiotelephone operable in a TDMA communication scheme. The switch circuit is disposed upon a plurality of tandemly-positioned ceramic substrates having transmission lines disposed upon one of the ceramic substrates. The switch circuit alternately connects transmitter circuitry to an antenna or receiver circuitry to the antenna, thereby alternately to permit transmission or reception of signals generated by, or received by the radiotelephone. Because circuits disposed upon ceramic materials are of low insertion losses, the switch circuit is advantageously utilized to form a portion of the radiotelephone.

11 Claims, 4 Drawing Sheets

MULTI-CERAMIC LAYER SWITCH CIRCUIT

This is a continuation of application Ser. No. 08/040,780, filed Mar. 31, 1993, and now abandoned.

BACKGROUND OF THE INVENTION

The present invention relates generally to switch circuitry and, more particularly, to a switch circuit for a transceiver, such as a transceiver operable to transmit and to receive communication signals during alternate time periods.

A communication system is comprised, at a minimum, of a transmitter and a receiver interconnected by a communication channel. A communication signal is transmitted by the transmitter upon the transmission channel to be received by the receiver. A radio communication system is a communication system in which the transmission channel comprises a radio frequency channel defined by a range of frequencies of the electromagnetic frequency spectrum. A transmitter operative in a radio communication system must convert the communication signal into a form suitable for transmission upon the radio-frequency channel.

Conversion of the communication signal into a form suitable for transmission upon the radio-frequency channel is effectuated by a process referred to as modulation. In such a process, the communication signal is impressed upon an electromagnetic wave. The electromagnetic wave is commonly referred to as a "carrier signal." The resultant signal, once modulated by the communication signal, is commonly referred to as a modulated carrier signal. The transmitter includes circuitry operative to perform such a modulation process.

Because the modulated carrier signal may be transmitted through free space over large distances, radio communication systems are widely utilized to effectuate communication between a transmitter and a remotely-positioned receiver.

The receiver of the radio communication system which receives the modulated carrier signal contains circuitry analogous to, but operative in a manner reverse with that of, the circuitry of the transmitter and is operative to perform a process referred to as demodulation.

Numerous modulated carrier signals may be simultaneously transmitted upon differing radio frequency channels of the electromagnetic frequency spectrum. Regulatory bodies have divided portions of the electromagnetic frequency spectrum into frequency bands, and have regulated transmission of the modulated carrier signals upon various ones of the frequency bands. (Frequency bands are further divided into channels, and such channels form the radio-frequency channels of a radio communication system. Such channels shall, at times, be referred to hereinbelow by the term conventionally-defined frequency channels.)

A two-way radio communication system is a radio communication system, similar to the radio communication system above-described, but which permits both transmission and reception of a modulated carrier signal from a location and reception at such location of a modulated carrier signal. Each location of such a two-way radio communication system contains both a transmitter and a receiver. The transmitter and the receiver positioned at a single location typically comprise a unit referred to as a radio transceiver, or more simply, a transceiver.

A cellular communication system is one type of two-way radio communication system in which communication is permitted with a radio transceiver positioned at any location within a geographic area encompassed by the cellular communication system.

A cellular communication system is created by positioning a plurality of fixed-site radio transceivers, referred to as base stations or base sites, at spaced-apart locations throughout a geographic area. The base stations are connected to a conventional, wireline telephonic network. Associated with each base station of the plurality of base stations is a portion of the geographic area encompassed by the cellular communication system. Such portions are referred to as cells. Each of the plurality of cells is defined by one of the base stations of the plurality of base stations, and the plurality of cells together define the coverage area of the cellular communication system.

A radio transceiver, referred to in a cellular communication system as a cellular radiotelephone or, more simply, a cellular phone, positioned at any location within the coverage area of the cellular communication system, is able to communicate with a user of the conventional, wireline, telephonic network by way of a base station. Modulated carrier signals generated by the radiotelephone are transmitted to a base station, and modulated carrier signals generated by the base station are transmitted to the radiotelephone, thereby to effectuate two-way communication therebetween. (A signal received by a base station is then transmitted to a desired location of a conventional, wireline network by conventional telephony techniques. And, signals generated at a location of the wireline network are transmitted to a base station by conventional telephony techniques, thereafter to be transmitted to the radiotelephone by the base station.)

Increased usage of cellular communication systems has resulted, in some instances, in the full utilization of every available transmission channel of the frequency band allocated for cellular radiotelephone communication. As a result, various ideas have been proposed to utilize more efficiently the frequency band allocated for radiotelephone communications. By more efficiently utilizing the frequency band allocated for radiotelephone communication, the transmission capacity of an existing, cellular communication system may be increased.

The transmission capacity of the cellular communication system may be increased by minimizing the modulation spectrum of the modulated signal transmitted by a transmitter to permit thereby a greater number of modulated signals to be transmitted simultaneously. Additionally, by minimizing the amount of time required to transmit a modulated signal, a greater number of modulated signals may be sequentially transmitted.

By converting a communication signal into discrete form prior to transmission thereof, the resultant modulated signal is typically of a smaller modulation spectrum than a corresponding modulated signal comprised of a communication signal that has not been converted into discrete form. Additionally, when the communication signal is converted into discrete form prior to modulation thereof, the resultant, modulated signal may be transmitted in short bursts, and more than one modulated signal may be transmitted sequentially upon a single, conventionally-defined, frequency channel. (As more than one modulated signal may be transmitted upon a single, conventionally-defined, frequency channel, the term frequency channel is sometimes referred to as the portion of the conventionally-defined frequency channel during which a particular transmitter transmits a modulated signal to a particular receiver. Hence, in a communication scheme in which modulated signals are transmitted in discrete bursts, two or more frequency channels may be defined upon a single, conventionally-defined, frequency channel.)

As a single frequency channel is utilized to transmit two or more separate signals during nonoverlapping time periods, a method of signal transmission is referred to as a time division method. A communication system incorporating such a time division method of signal transmission includes a Time Division Multiple Access communication system or, more simply, a TDMA communication system.

A TDMA communication system includes a transmitter operative to transmit signals to a receiver in intermittent bursts during intermittent time periods. Such signal transmitted to a particular receiver operative in a TDMA communication system shall hereinafter be referred to as a TDMA signal.

A TDMA communication system is advantageously utilized as a cellular communication system as, during time periods in which a base station does not transmit a TDMA signal to a particular radiotelephone, other TDMA signals may be transmitted. In particular, the radiotelephone to which the base station transmits a TDMA signal may, in turn, transmit a TDMA signal to the base station, thereby permitting two-way communication between the base station and the radiotelephone upon a single, conventionally-defined frequency channel as signals transmitted to the radiotelephone by the base station, and by the radiotelephone to the base station may be timed to occur during alternate time periods.

As the transmitter and receiver circuitry portions of the radiotelephone operative in such a TDMA communication system are required to be operable only during alternate time periods, certain circuitry portions of radiotelephones operable in conventional, cellular communication systems are not required. For instance, duplexer filters positioned to interconnect both the transmitter circuitry portion and the receiver circuitry portion of the conventional, cellular radiotelephone and the radiotelephone antenna theretogether, are not required to form portions of radiotelephones operable in a TDMA communication system as the receiver and transmitter circuitry portions of such radiotelephone need not be operable simultaneously. Rather, switch circuitry may be utilized alternately to connect the receiver circuitry portion with the radiotelephone antenna or the transmitter circuitry portion with the radiotelephone antenna.

Conventional switch circuitry utilized alternately to connect the receiver circuitry portion or the transmitter circuitry portion with the radiotelephone antenna have been comprised of discrete, component elements or, discrete, component elements together with conventional transmission lines. In general, such switch circuits are operable alternately to connect electrically either the receiver or transmitter circuitry portion of the radiotelephone to the radiotelephone antenna while also electrically isolating the other of the radiotelephone circuitry portion from the radiotelephone antenna.

However, either of such constructions of switch circuits include circuit elements which are of low relative quality factors (Q factors values) and, hence, exhibit significant amounts of insertion loss. Hence, while such circuits are oftentimes represented with idealized elements, parasitic effects caused as a result of stray capacitances and inductances cause such switch circuits to be inherently inefficient. To overcome such inefficiency of the conventional switch circuits, amplifier portions of the transmitter circuitry portion of the radiotelephone must amplify signals which are to be transmitted at greater amplification levels. Such greater amplification levels, however, result in increased energy consumption of the radiotelephone.

A switch circuit exhibiting a lesser amount of insertion loss would permit lesser amounts of energy to be consumed during operation of the radiotelephone.

What is needed, therefore, is a switch circuit exhibiting a lesser amount of insertion loss than the amount of insertion loss exhibited by conventional, switch circuits.

SUMMARY OF THE INVENTION

The present invention, accordingly, advantageously provides a switch circuit, and associated method, of minimal insertion loss.

The present invention further advantageously provides a switch circuit for a transceiver operable alternately to connect receiver circuity or transmitter circuitry of the transceiver to a transceiver antenna.

The present invention yet further advantageously provides a radiotelephone having a switch circuit for alternately connecting a receiver circuitry portion or a transmitter circuitry portion thereof to a radiotelephone antenna.

The present invention includes further advantages and features, the details of which will become more readily apparent by reading the detailed description of the preferred embodiments hereinbelow.

In accordance with the present invention, therefore, a switch circuit, and associated method, for a transceiver having transmitter circuitry and receiver circuitry is disclosed. The switch circuit is positionable responsive to levels of a control signal applied thereto. The switch circuit connects alternately the transmitter circuitry to a transceiver antenna or the receiver circuitry to the transceiver antenna. A first circuit path interconnects the transmitter circuitry and a first side portion of the transceiver antenna wherein the first circuit path is of electrical characteristics dependent upon the levels of the control signal. A second circuit path interconnects the receiver circuitry and the first side portion of the transceiver antenna wherein, depending upon the levels of the control signal, the second circuit path includes a shunt path as a portion thereof. A control-signal transmission line is disposed upon at least one ceramic substrate coupled to the first circuit path for applying therethrough the control signal to the first circuit path. The first circuit path is caused to form a short circuit to connect electrically the transmitter circuitry and the transceiver antenna and also to cause the shunt path to form a portion of the second circuit path, thereby to disconnect electrically the receiver circuitry from the transceiver antenna only during times when the control signal is beyond a first signal level. Otherwise, the first circuit path is caused to form an open circuit to disconnect electrically the transmitter circuitry from the transceiver antenna and also to disconnect the shunt path from the second circuit path, thereby to connect electrically the receiver circuitry and the transceiver antenna.

BRIEF DESCRIPTION OF THE DRAWINGS

The present invention will be better understood when read in light of the accompanying drawings in which.

DESCRIPTION OF THE PREFERRED EMBODIMENTS

Figure 1:
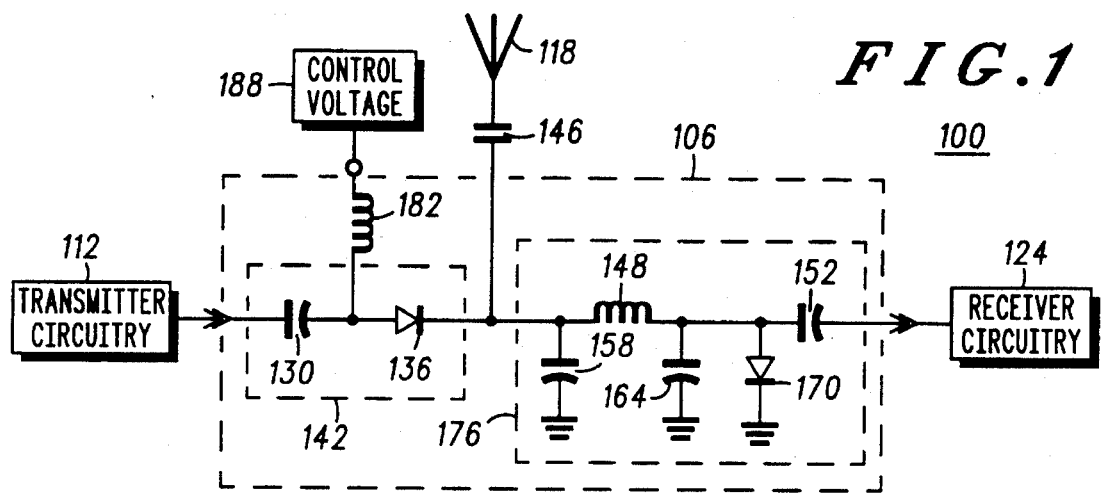
FIG. 1 is an electrical circuit schematic of a switch circuit comprised of discrete component elements which forms an equivalent circuit with a corresponding electrical circuit schematic of the switch circuit of a preferred embodiment of the present invention.

Turning first to the electrical circuit schematic of FIG. 1, a radio transceiver, referred to generally by reference numeral 100, is shown. Radio transceiver 100 may, for example, comprise a radiotelephone operable in a cellular communication system.

Radio transceiver 100 includes a switch circuit 106, comprised of the elements contained within the block indicated by reference numeral 106, for alternately connecting transmitter circuitry 112 with transceiver antenna 118 or receiver circuitry 124 with transceiver antenna 118. Depending upon the positioning of switch circuit 106, therefore, radio transceiver 100 is operable either to transmit a signal generated by transmitter circuitry 112 from transceiver antenna 118 or to apply a signal transmitted to transceiver antenna 118 to receiver circuitry 124. Because the transceiver is thereby operable alternately to transmit signals or to receive signals, transceiver 100 is advantageously utilized in a TDMA communication scheme.

The elements comprising switch circuit 106 are illustrated to be discrete elements. Series-connected capacitor 130 and diode 136 together form a first circuit path, represented by block 142 shown in hatch, which interconnects transmitter circuitry 112 and transceiver antenna 118. Capacitor 130 is of a capacitive value such that the capacitor forms a DC blocking capacitor which forms an open circuit for DC signals, but which forms a short circuit for high frequency signals. The anodic portion of diode 136 is connected to a side of capacitor 130, and the cathodic portion of diode 136 is coupled to transceiver antenna 118 by way of capacitor 146. Capacitor 146 is of a capacitive value to form a short circuit at radio frequencies and an open circuit at dc levels. Diode 136 forms a short circuit only when the diode is biased with a positive voltage. At other times, diode 136 forms an open circuit.

Switch circuit 106 further comprises series-connected inductor 148 and capacitor 152 as well as shunt-connected capacitors 158 and and diode 170. Capacitor 152, similar to that of capacitor 130, is of a capacitive value to form a DC blocking capacitor. Capacitor 152 forms a open circuit for DC signals while forming a short circuit for high frequency signals. Diode 170 forms a short circuit when a positive voltage is supplied to the anodic portion thereof to cause the diode 170 to form a shunt path to ground when the positive voltage is applied thereto; otherwise, diode 170 forms an open circuit.

Inductor 148, capacitors 152, 158, and 164, and diode 170 together form second circuit path 176 which interconnects receiver circuitry 124 and transceiver antenna 118.

Switch circuit 106 further includes inductor 182 which forms a radio frequency choke. A first side of inductor 182 is connected to a node extending between capacitor 130 and diode 136 of first circuit path 142. A second side of inductor 182 is coupled to a voltage supply, here shown in block form by block 188 identified as a control voltage. The value of the control voltage formed of the voltage supply is determinative as to whether transmitter circuitry 112 or receiver circuitry 124 is electrically connected to transceiver antenna 118. The value of the control voltage is, for example, determined by processor circuitry (not shown in the figure) of transceiver 100. When a determination is made that transceiver 100 is to transmit a signal, such processor generates a signal to cause the control voltage to be of a large voltage level, and when a determination is made that transceiver 100 is to receive a signal transmitted thereto, such processor generates a signal to cause the control voltage to be of a low value. (Viz., the large voltage level is a level great enough to forward bias diodes 136 and 170.)

In operation, when transceiver 106 is to transmit a signal, the control voltage coupled to the side portion of inductor 182 is of a large, positive value. Such positive value causes diodes 136 and 170 to be of very low impedances, hence effectively to form short circuits. (For simplicity, hereinbelow, diodes shall be referred to as being either short circuits or open circuits even though such elements are actually of very low or very high impedance values.) Thereby, first circuit path 142 electrically connects transmitter circuitry 112 with transceiver antenna 118 and the shunt path formed of diode 170 shunts receiver circuitry 124 to ground. The node formed at the connection of inductor 148 and capacitor 158 is also of a high impedance while the node formed at the connection between inductor 148, capacitors 152 and 164, and diode 170 is of a low impedance value. Signals generated by transmitter circuitry 112 (modulated to be of high frequencies) are thereby applied to transceiver antenna 118 for transmission therefrom.

Conversely, when the control voltage is of a low value (here, for instance, at a value of zero, or close to zero, volts) diodes 136 and 170 are open circuits. Thereby, transmitter circuitry 112 is electrically isolated from transceiver antenna 118. And, as diode 170 does not form a shunt path, receiver circuitry 124 is electrically connected, by way of second circuit path 176, with antenna 118.

As noted previously, because circuits comprised of discrete component elements are of low Q values (i.e., relative quality factors, briefly noted hereinabove), such circuits exhibit significant insertion loss at radio frequencies, a radio transceiver such as transceiver 100 having a switch circuit such as switch circuit 106 comprised solely of discrete component elements is inherently inefficient due to the large insertion loss at radio frequencies exhibited by such discrete component elements.

Figure 2:
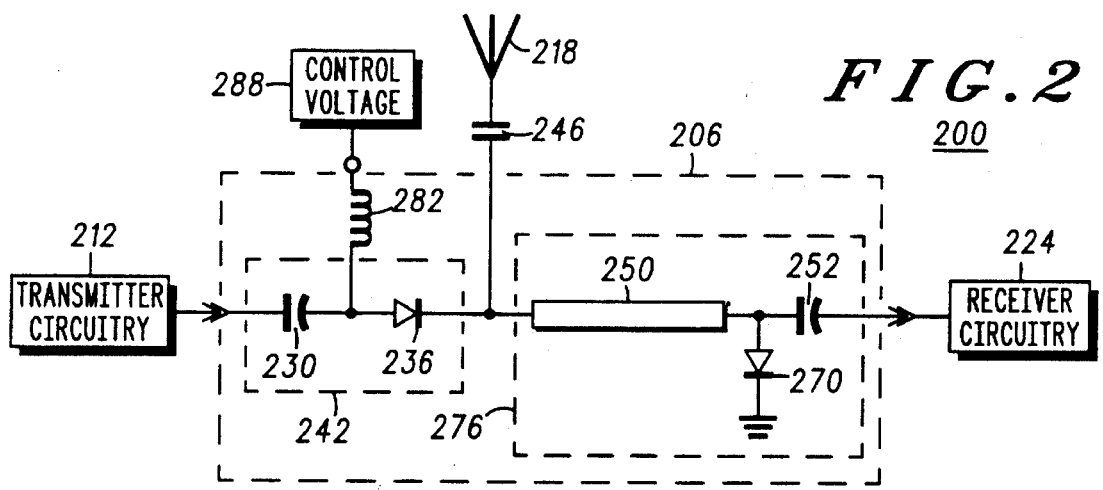
FIG. 2 is an electrical circuit schematic of a switch circuit, similar with that of FIG. 1, but in which a portion of the switch circuit comprises a transmission line.

Turning next to FIG. 2, a radio transceiver, referred to generally by reference numeral 200 is shown. Radio transceiver 200 is operable in a manner similar with that of radio transceiver 100 of FIG. 1 and includes a switch circuit, here switch circuit 206 (comprised of the elements shown within the block), transmitter circuitry 212, transceiver antenna 218, and receiver circuitry 224.

Switch circuit 206 is operable alternately to connect transmitter circuitry 212 with antenna 218 or receiver circuitry 224 with transceiver antenna 218. Switch circuit 206 comprises series-connected capacitor 230 and diode 236 which together form first circuit path 242, represented by the block shown in hatch. First circuit path 242, and the circuit elements forming such, are analogous to first circuit path 142 of radio transceiver 100 of FIG. 1. Capacitor 246, analogous to capacitor 146 of transceiver 100 of FIG. 1, also forms a portion of transceiver 200.

Switch circuit 206 further comprises series-connected transmission line 250 and capacitor 252 as well as diode 270, positioned in a shunt configuration. Transmission line 250, capacitor 252, and diode 270 together form a second circuit path, represented by block 276, shown in hatch. Second circuit path 276 and the elements comprising such are analogous to second circuit path 176 of transceiver 100 of FIG. 1. Circuit paths 276 and 176 differ only in that transmission line 250 is substituted for the discrete elements 148, 158, and 164 of second circuit path 176.

Switch circuit 206 further includes inductor 282 which forms a radio frequency choke. A first side portion of inductor 282 is connected to first circuit path 242 at the node formed between capacitor 230 and diode 236. A second side portion of inductor 282 is connected to a voltage supply, here a control voltage represented by block 288. The voltage source represented by control voltage block 288 and inductor 282 are analogous to control voltage block 188 and inductor 182 of radio transceiver 100 of FIG. 1.

Operation of switch circuit 206 of radio transceiver 200 is analogous with operation of switch circuit 106 of radio transceiver 100 of FIG. 1, and the details of operation of circuit 206 shall not be described in detail.

It should be noted that transmission line 250 is functionally equivalent to the combination of capacitors 158 and 164 and inductor 148 of second circuit path 176 and may be alternately represented by such discrete components. Transmission line 250 is advantageously utilized in place of discrete component elements for the reason that a transmission line exhibits less insertion loss than the corresponding discrete component elements, and, due to the lesser amount of insertion loss exhibited by transmission line 250, more efficient operation of the switch circuit is permitted. Conventionally, transmission line 250 is comprised of either a conventional strip line or micro strip. Transmission line 250 is of a length substantially corresponding to one quarter the wavelengths of signals to be transmitted by transceiver antenna 218. (It should be noted that transmission line 250 forms an open circuit at radio frequencies at a location of a length of one-quarter wavelength of the radio-frequency, transmission signal generated by transmitter circuitry 212 away from the location of a short to ground which here occurs when diode 270 forms a short circuit. When diode 270 forms a short circuit and transmission line 250 forms an open circuit at a location of one-quarter, wavelength away from diode 270, i.e., at the side of transmission line 250 located away from diode 270, transceiver antenna 218 becomes isolated from receiver circuitry 224.

However, even though transmission line 250 is of a higher Q value than the corresponding discrete components of switch 106 of FIG. 1, and, hence, exhibits a lesser amount of insertion loss than do the corresponding discrete components of switch 106 of FIG. 1, conventional transmission lines also exhibit significant amounts of insertion loss. Accordingly, a radio transceiver, similar to radio transceiver 200, including a switch circuit, similar to switch circuit 206, having a transmission line forming a portion thereof, is also inherently inefficient (albeit less inefficient than a switch circuit comprised solely of discrete components) due to the large amount of insertion loss associated with the elements of the switch circuit.

Figure 3:
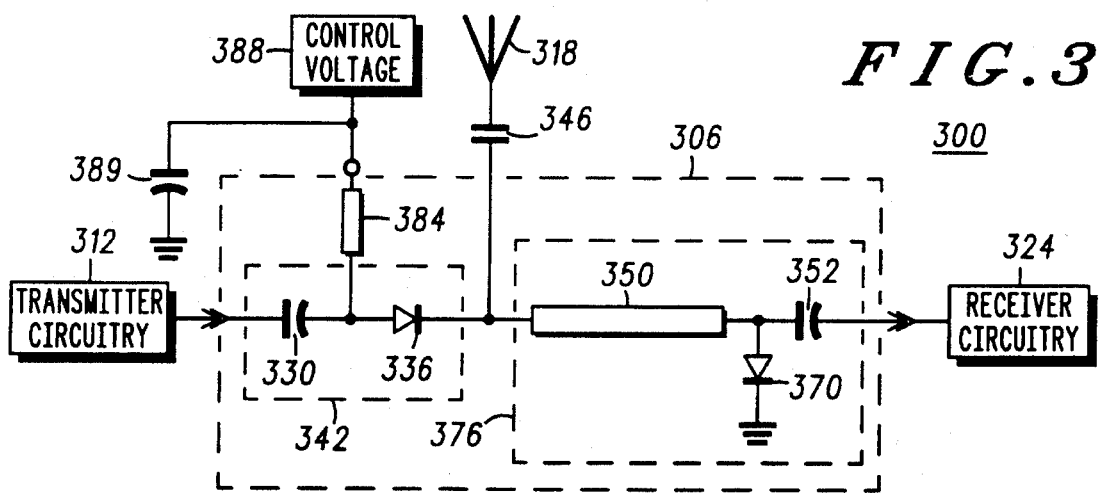
FIG. 3 is an electrical circuit schematic of a switch circuit of a preferred embodiment of the present invention.

Turning next to the electrical circuit schematic of FIG. 3, a preferred embodiment of the present invention is shown. FIG. 3 illustrates an electrical circuit schematic of radio transceiver 300 which includes switch circuit 306 comprised of the elements shown within the block, transmitter circuitry 312, and receiver circuitry 324. Switch 306 is operative alternately to connect transmitter circuitry 3 12 to transceiver antenna 318 or receiver circuitry 324 to transceiver antenna 318. Switch circuit 306, analogous to the switch circuits of the preceding figures, includes a series-connected capacitor 330 and diode 336. Capacitor 330 and diode 336 together comprise first circuit path 342 which is analogous to first circuit paths 242 and 142 of the preceding figures. Dc blocking capacitor 346 is further shown in the figure and is analogous to capacitors 246 and 146 of the preceding figures.

Switch circuit 306 further includes series-connected transmission line 350 and capacitor 352. Capacitor 352 is of a capacitive value to form a DC blocking capacitor and transmission line 350 is of a length substantially corresponding to one quarter the wavelength of signals to be transmitted by transceiver antenna 318 and applied to receiver circuitry 324. And, diode 370 is positioned in a shunt configuration in a manner analogous to the positioning of diodes 270 and 170 of the preceding figures. Transmission line 350, capacitor 352, and diode 370 together form second circuit path 376, represented by the block shown in hatch, and which is operable in manners analogous to the manners in which second circuit paths 276 and 176 of the preceding figures are operable.

Switch circuit 306 further comprises transmission line 384 having a first side portion thereof connected to the node defined at the connection between capacitor 330 and diode 336. A second side portion of transmission line 384 is coupled to a voltage source, here once again a control voltage represented by block 388. The control voltage is also isolated from ground by way of capacitor 389. Application of the control voltage to transmission line 384 is effectuated in manners analogous to the application of the control voltage to inductors 282 and 182 of the preceding figures. Transmission line 384 is of a length substantially corresponding to one quarter the wavelengths of signals generated by transmitter circuitry 312. Capacitor 389 is of a value to form a short circuit to ground at radio frequencies. Transmission line 384 forms an open circuit at radio frequencies at a position located at a distance of one-quarter the wavelength of the radio-frequency, transmitted signal generated by transmitter circuit 212 away from the location of a short to ground. Transmission line 384 does not form an open circuit for the dc, control voltage generated by control voltage 388.

Radio transceiver 300 differs with that of radio transceiver 200 of FIG. 2 not only due to the substitution of transmission line 384 for inductor 282, but also because transmission lines 350 and 384 are formed upon substrates of a ceramic-type material rather than being comprised of conventional strip line or micro strip transmission lines. Transmission lines disposed upon ceramic-type materials exhibit much lower levels of insertion loss than corresponding transmission lines of conventional construction. Hence, radio transceiver 300 is inherently more efficient than radio transceivers 200 and 100 of the preceding figures.

While, in the preferred embodiment of FIG. 3, transmission lines 350 and 384 are disposed upon a ceramic-type material, the elements comprising first and second circuit paths 342 and 376 may also be disposed upon one or more ceramic substrates.

Figure 4:
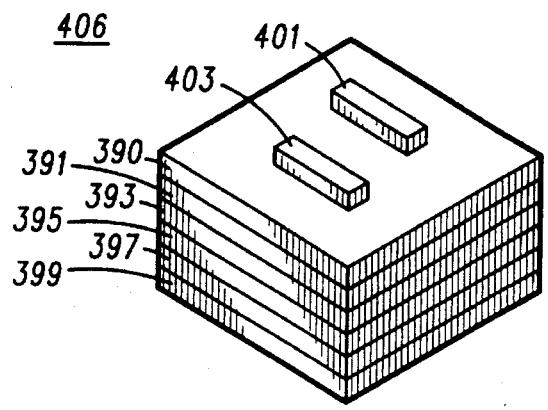
FIG. 4 is a schematic view of a plurality of tandemly-positioned, ceramic plate members which together form a switch circuit of a preferred embodiment of the present invention.

Turning next to the schematic view of FIG. 4, a switch circuit, here referred to generally by reference numeral 406, of a preferred embodiment of the present invention is shown in schematic form. Switch circuit 406 is equivalent to switch circuit 306 of FIG. 3 wherein many of the elements comprising first and second circuit paths 342 and 376 are also (in addition to transmission lines 350 and 384) disposed upon ceramic-type substrates. In the embodiment of FIG. 4, switch 406 is comprised of six tandemly-positioned ceramic substrates. Transmission lines 350 and 384 and the component elements of first and second circuit paths 342 and 376 are disposed on various ones of the substrates.

Top ceramic substrate 390 is positioned above second ceramic substrate 391 which, in turn, is positioned above third ceramic substrate 393. Third ceramic substrate 393, in turn, is positioned above fourth ceramic substrate 395, which, in turn, is positioned above fifth ceramic substrate 397. Fifth ceramic substrate 397, in turn, is positioned above bottom ceramic substrate 399.

Various portions of various of the component elements corresponding to first and second circuit paths 342 and 376 and transmission line 384 of switch circuit 306 of radio transceiver 300 are disposed upon various ones of ceramic substrates 390–399. Vias formed of paths of conductive material extending through potions of various ones of the ceramic substrates 390–399 permit interconnection between components disposed upon various ones of the substrates 390–399. Discrete diodes (preferably PIN-type diodes) 401 and 403 are mounted upon the top surface of first ceramic substrate 390. Diodes 401 and 403 correspond to diodes 336 and 370 of FIG. 3. Once the ceramic substrates 390–399 are tandemly-positioned in the desired arrangement shown in the figure (and diodes 401 and 403 are mounted upon substrate 390), the plurality of tandemly-positioned substrates are fired (i.e., the ceramic substrates are baked in an oven) for a period of time, thereby to form a rigid structure of the plurality of ceramic substrates 390–399.

Figure 5A:
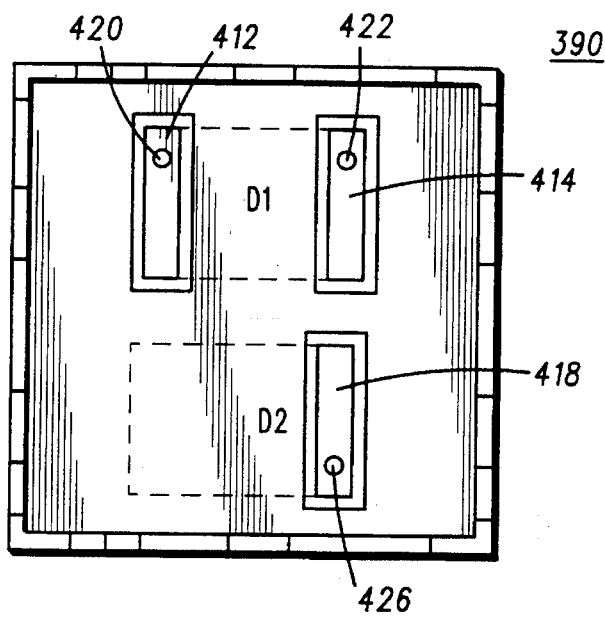
FIG. 5A is a plan view of a first ceramic plate member of the plurality of ceramic plate members of the switch circuit shown in FIG. 4 and which has a portion of the switch circuit of FIG. 3 disposed thereupon.

Turning next to the plan view of FIG. 5A, the top surface of ceramic substrate 390 is shown. Coatings of electrically-conductive material disposed upon the top face surface of ceramic substrate 390 are indicated by sections of the face surface shown by hatch markings. As illustrated, three pads 412, 414, and 418 are disposed upon the top face surface of ceramic substrate 390. Top ends of vias 420, 422, and 426 are positioned within respective ones of pads 412–418. Pads 412 and 414 form mounting locations permitting mounting of diode 401 (shown in FIG. 4) thereupon, and pad 418 forms a mounting location permitting mounting of diode 403 (also shown in FIG. 4) thereupon. A second side of diode 403 is mounted upon the face surface of substrate 390 which is coated with the coating of the electrically-conductive material and which defines a ground plane. Top ends of vias 420 and 422 permit connection of diode 401, once mounted in position upon pads 412 and 414, to other circuitry disposed upon others of the ceramic substrates 391–399. And, via 426 permits connection of diode 403, once mounted in position, to circuitry disposed upon others of the ceramic plates 391–399.

Figure 5B:
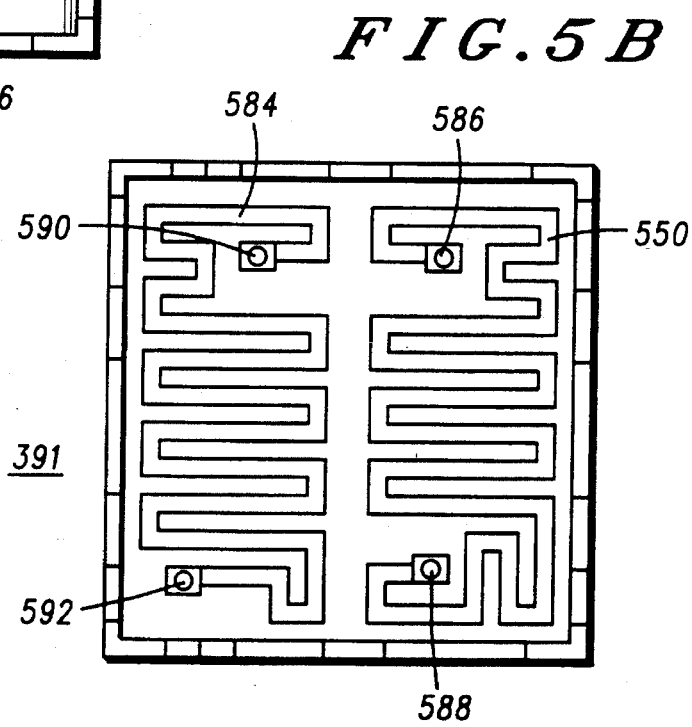
FIG. 5B is a plan view, similar to that of FIG. 5A, but of a second ceramic plate member of the plurality of ceramic plate members of the switch circuit shown in FIG. 4 and which has a portion of the switch circuit of FIG. 3 disposed thereupon.

FIG. 5B is a plan view of the top surface of second ceramic substrate 391. Similar to the preceding figure, coatings of conductive material formed upon the top face surface of ceramic substrate 391 are indicated by hatch markings. Serpentine-like paths 550 and 584 are formed upon the face surface of second substrate 391. Such paths form transmission lines analogous to transmission lines 350 and 384 of switch circuit 306 of FIG. 3. Lengths of each of the paths 550 and 584 substantially correspond to lengths of one quarter the wavelengths of signals to be transmitted by a transceiver incorporating switch circuit 406 of which paths 550 and 584 form portions. (By process of experimentation, variation in the extent of the serpentine-like shape of the transmission lines cause slight variance in the characteristics thereof; such variation may alter slightly the performance of the circuit so-formed.)

Top ends of vias 586, 588, 590, and 592, which extend through substrate 391 are also shown in the figure. Via 586 is positioned to permit alignment with via 422, via 588 is positioned to permit alignment with via 426, and via 590 is positioned to permit alignment with via 420. When ceramic substrates 390 and 391 are aligned with one another and tandemly-positioned theretogether, an end portion of path 584 becomes electrically connected to diode 401 mounted upon pad 412 of substrate 390, a side portion of path 550 is similarly connected to diode 401 mounted upon pad 414, and a second side portion of path 550 is connected to diode 403 mounted upon pad 418. As noted previously, formation of transmission lines formed of paths 550 and 584 upon a ceramic substrate is advantageous as the insertion loss of transmission lines so-formed is significantly lower than the insertion loss of conventional, transmission lines formed of strip lines and micro strips.

Figure 5C:
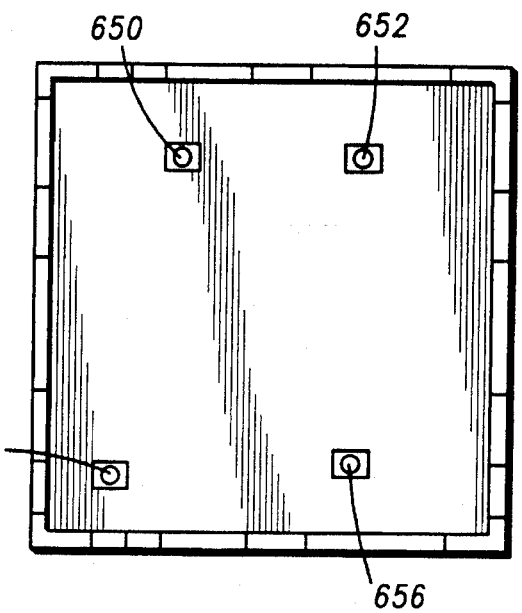
FIG. 5C is a plan view, similar to those of FIGS. 5A and 5B, but of a third ceramic plate member of the plurality of ceramic plate members of the switch circuit shown in FIG. 4 and which also has a portion of the switch circuit of FIG. 3 disposed thereupon.

FIG. 5C is a plan view of a top face surface of ceramic substrate 393 of switch circuit 406 of FIG. 4. Only top ends of vias 650, 652, 654, and 656 are disposed upon the top face surface of ceramic substrate 393. And a substantial portion of the ramainder of the face surface is coated with the coating of electrically-conductive material but for small isolation areas positioned about the top ends of vias 650–656. Because of the coating of electrically-conductive material disposed upon substrate 393, substrate 393 forms an isolation plane for isolating paths 550 and 584 which form transmission lines. Vias 650–656 serve merely to interconnect respective ones of the vias 424, 586, 588, and 590 (and the associated elements connected to such vias) to circuit elements disposed upon others of the substrates 395-399.

Figure 5D:
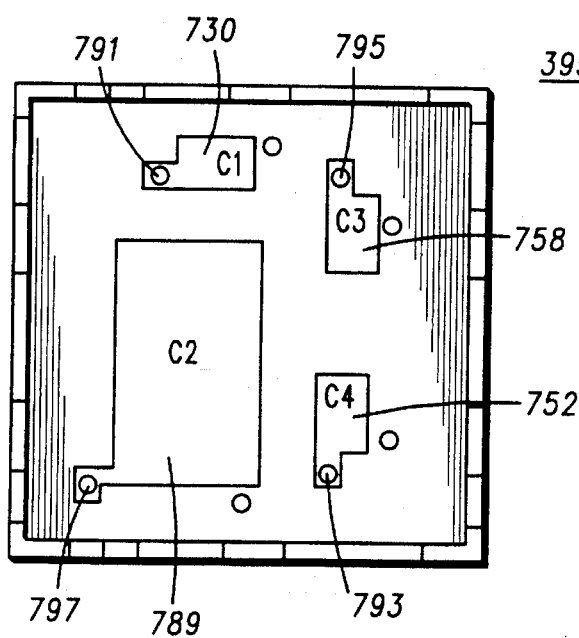
FIG. 5D is a plan view, similar to those of FIGS. 5A through 5C, but of a fourth ceramic plate member of the plurality of ceramic plate members of the switch circuit of FIGS. 3 and 4.

FIG. 5D is a plan view of a top face surface of ceramic substrate 395. Again, portions of the top face surface of substrate 395 coated with the coating of the electrically-conductive material are indicated by hatch markings in the figure. As illustrated, four pads, namely pads 730, 752, 758, and 789 are formed upon the face surface of substrate 395.

Each of the pads 730–789 form plates of capacitors which correspond to plates of capacitors 330, 352, 346, and 389 of switch circuit 306 of FIG. 3. Top ends of vias 791, 793, 795, and 797 are also shown in the figure. Via 791 is positioned to permit alignment with via 650, via 793 is positioned to permit alignment with via 656, via 795 is positioned to permit alignment with via 652, and via 797 is positioned to permit alignment with via 654.

Figure 5E:
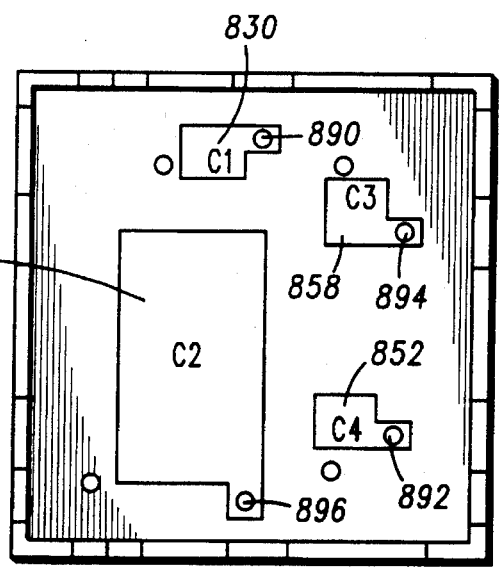
FIG. 5E is a plan view, similar to those of FIGS. 5A through 5D, but of a fifth ceramic plate member of the plurality of ceramic plate members of the switch circuit of FIGS. 3 and 4.

FIG. 5E is a plan view, similar to those of the preceding four figures, but of a top face surface of ceramic substrate 397. Again, coatings of the electrically-conductive material coated upon portions of the face surface of substrate 397 are indicated by hatch markings. As illustrated, pads 830, 852, 858, and 897 are formed upon the face surface of substrate 397. Top ends of vias 890, 892, 894, and 896 are also shown in the figure. Analogous to plate members 730–789 disposed upon the face surface of substrate 395, pads 830–899 disposed upon the face surface of substrate 397 also form plate members of capacitors corresponding to capacitors 330, 352, 346, and 389 of switch circuit 306 of FIG. 3. It should be noted that vias 890–896 are positioned not to align with vias 791–797 and are electrically isolated therefrom. Thereby, plate members 730 and 830, 752 and 852, 758 and 858, and 789 and 889 are maintained in isolation from one another, thereby to form opposing sides of capacitors.

It should be noted that variation in the sizes of the plates of the capacitors permits variance in the capacitive values of the capacitors formed of such plates. Capacitors of even larger values may be formed by positioning pluralities of substrates wherein the pluralities of plates are positioned in parallel connections. (Use of additional numbers of substrates would, of course, cause the filter circuit to be of a greater thickness.)

Figure 5F:
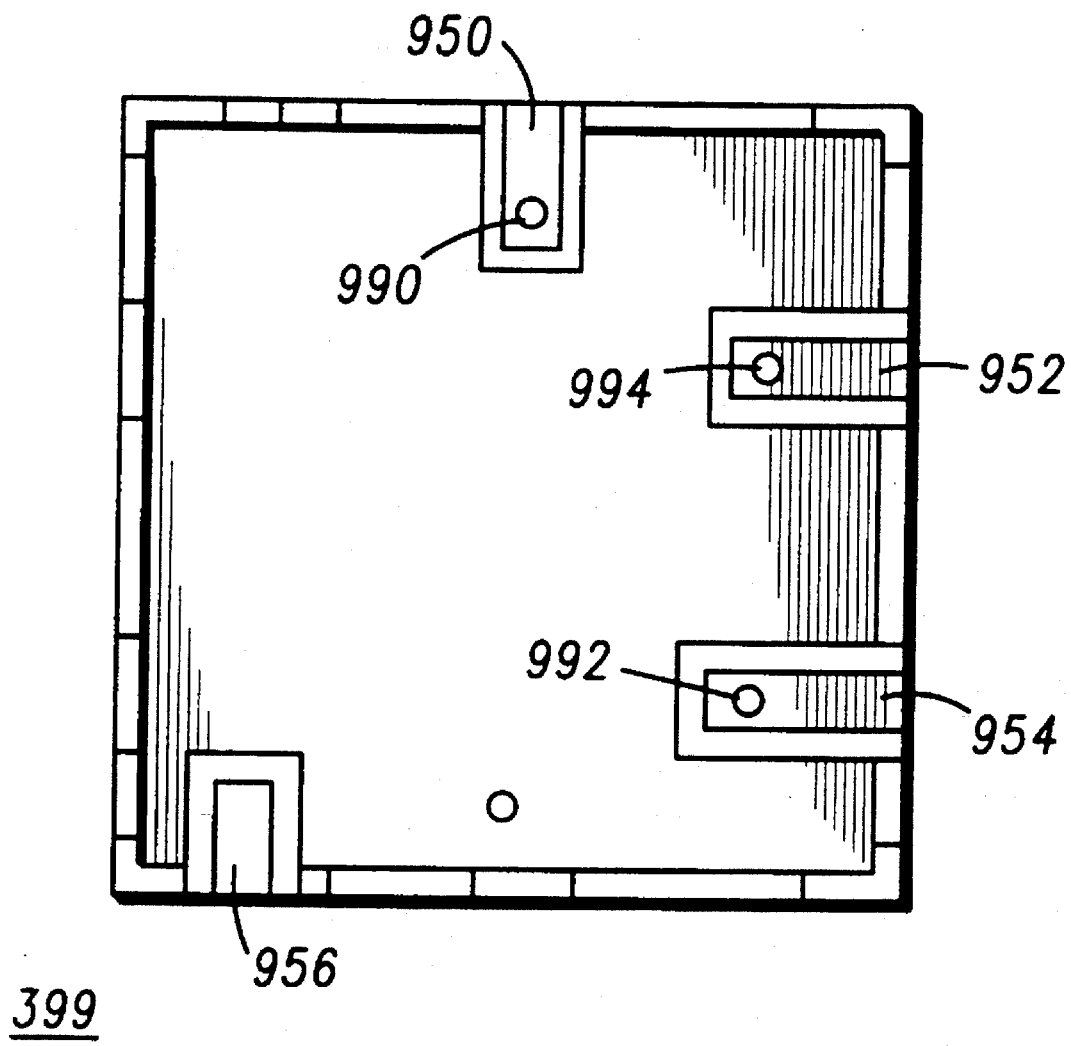
FIG. 5F is a plan view, similar to those of FIGS. 5A through 5E, but of a sixth ceramic plate member of the plurality of ceramic plate members of the switch circuit of FIGS. 3 and 4.

Finally, turning to FIG. 5F, a top face surface of ceramic substrate 399 is shown. Again, portions of the face surface of the substrate coated with the coating of electrically-conductive material is indicated by hatch markings. Four pads, namely pads 950, 952, 954, and 956 are disposed upon the top face surface of substrate 399. Other portions of the surface of substrate 399 are also coated with the coating of electrically-conductive material, but isolated from pads 950–956 by isolation areas about the pads. Top ends of vias 990, 992, 994, and 996 are also illustrated. Pad 950 permits connection to transmitter circuitry (such as transmitter circuitry 312 of radio transceiver 300 of FIG. 3). Pad 952 permits connection to a transceiver antenna (such as transceiver antenna 318 of radio transceiver 300 of FIG. 3), pad 954 permits connection to receiver circuitry (such as receiver circuitry 324 of transceiver 300 of FIG. 3), and pad 956 permits connection with an external, bias voltage. Via 990 is positioned to permit alignment with via 890 of substrate 397, via 994 is positioned to permit alignment with via 894, via 992 is positioned to permit alignment with via 892, and via 996 is positioned to permit alignment with via 896. Hence, by suitably connecting transmitter and receiver circuitry to pads 950 and 994, respectively, a transceiver antenna to pad 952, and by applying a control voltage to pad 956, a circuit similar to the circuit of radio transceiver 300 of FIG. 3 may be formed.

By suitably aligning of substrates 390–399, positioning the substrates 390–399 in tandem, firing the substrates, and positioning, such as, e.g., by soldering, diodes upon mounting pads 412–418 of top substrate 390, a switch circuit corresponding to switch circuit 406 of FIG. 4, may be formed. In a preferred embodiment, after firing of the substrates, the switch circuit is of a height of approximately thirty-one mils. Because the switch circuit exhibits much less insertion loss than switch circuits of conventional construction, use of the switch circuit of the preferred embodiments of the present invention permits a radio transceiver, such as a cellular radiotelephone operable in a TDMA communication system, to be more efficiently operable.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A switch circuit for a transceiver having a transmitter circuitry and a receiver circuitry, said switch circuit positionable responsive to levels of a control signal applied thereto for connecting alternately the transmitter circuitry to a transceiver antenna or the receiver circuitry to the transceiver antenna, said switch circuit comprising:

a DC blocking capacitor formed on the first and second ceramic substrates, a first side portion of said DC blocking capacitor for interconnection with a first side portion of the transceiver antenna;

a receiver circuit path interconnecting the receiver circuitry and a second side portion of the DC blocking capacitor wherein, depending upon the levels of the control signal, said receiver circuit path includes a shunt path as a portion thereof and wherein said receiver circuit path includes a receiver-side stripline transmission line formed upon a third ceramic substrate, a first ground plane adjacent to one side of the third ceramic substrate, and a second ground plane adjacent to an opposing side of the third ceramic substrate, wherein one of said first and second ground planes is formed on an adjacent ceramic substrate, wherein said receiver-side stripline transmission line is of a length substantially corresponding to one-quarter a wavelength of signals to be received at the transceiver antenna;

a transmitter circuit path interconnecting the transmitter circuitry and the second side portion of the DC blocking Capacitor wherein said transmitter circuit path is of electrical characteristics dependent upon the levels of the control signal; and a control-signal stripline transmission line formed upon the same third ceramic substrate and coupled to said transmitter circuit path to apply the control signal to the transmitter circuit path to cause the transmitter circuit path to form a low impedance path to connect electrically the transmitter circuitry and the transceiver antenna and also to cause the shunt path to form a portion of said receiver circuit path, thereby to disconnect electrically the receiver circuitry from the transceiver antenna only during times when the control signal is above a first signal level and, otherwise to cause the transmitter circuit path to form a high impedance path to disconnect electrically the transmitter circuitry from the transceiver antenna and also to disconnect the shunt path from the receiver circuit path, thereby to connect electrically the receiver circuitry and the transceiver antenna, wherein said control-signal stripline transmission line is of a length substantially corresponding to one-quarter a wavelength of signals to be transceived at the transceiver antenna.

2. The switch circuit of claim 1 wherein said transmitter circuit path includes a diode positioned in-line between the transmitter circuitry and the transceiver antenna, said diode operative to form a low impedance path when the control signal is above the first signal level and, otherwise, to form a high impedance circuit path.

3. The switch circuit of claim 2 wherein said transmitter circuit path includes a capacitor of a component value to form a second DC blocking capacitor thereof positioned in-line between the transmitter circuitry and the diode.

4. The switch circuit of claim 3 wherein the control-signal stripline transmission line is coupled to the transmitter circuit path at a location between the diode and the second DC blocking capacitor.

5. The switch circuit of claim 1 wherein said receiver-side stripline transmission line is operatively positioned in-line between the receiver circuitry and the transceiver antenna.

6. The switch circuit of claim 5 wherein the shunt path of the receiver circuit path is comprised of a diode configured in a shunt connection with the receiver circuitry, said diode comprising the shunt path operative to form a low impedance path when the control signal is above the first signal level and, otherwise, to form a high impedance path.

7. The switch circuit of claim 6 wherein said receiver circuit path includes a capacitor of a component value to form a second DC blocking capacitor thereof positioned in-line between the receiver circuitry and the receiver-side stripline transmission line.

8. The switch circuit of claim 8 wherein the diode comprising the shunt path is positioned between the second DC blocking capacitor and the receiver-side stripline transmission line.

9. The switch circuit of claim I wherein at least a portion of said transmitter circuit path is disposed upon a fourth ceramic substrate.

10. The switch circuit of claim 1 wherein a portion of said receiver circuit path is disposed on a fourth ceramic substrate.

11. A switch circuit disposed upon a plurality of tandemly-positioned ceramic substrates, said switch circuit for a transceiver having a transmitter circuit and a receiver circuit and positionable responsive to levels of a control signal applied thereto for connecting alternately the transmitter circuitry to a transceiver antenna or the receiver circuitry to the transceiver antenna, said switch circuit comprising:

a DC blocking capacitor formed on the first and second ceramic substrates of the tandemly-positioned substrates, a first side portion of said DC blocking capacitor for interconnection with a first side portion of the transceiver antenna;

a receiver circuit path interconnecting the receiver circuitry and a second side portion of the DC blocking capacitor, said receiver circuit path having receiver circuit path elements also disposed upon various plate members of a plurality of tandemly-positioned plate members wherein, depending upon the levels of the control signal, the receiver circuit path further includes a shunt path as a portion thereof and wherein said receiver circuit path includes a receiver-side stripline transmission line of one-quarter wavelength of signals to be received, formed upon a third ceramic substrate of the tandemly-positioned substrates, a first ground plane opposite the receiver-side stripline transmission line and adjacent to one side of the third ceramic substrate, and a second ground plane opposite the receiver-side stripline transmission line adjacent to an opposing side of the third ceramic substrate, wherein one of said first and second ground planes is formed on an adjacent ceramic substrate;

a transmitter circuit path interconnecting the transmitter circuitry and the first side portion of the transceiver antenna, said transmitter circuit path having transmitter circuit elements disposed on various ceramic substrates of the plurality of tandemly-positioned substrates, wherein said transmitter circuit path is of electrical characteristics dependent upon the levels of the control signal; and a control-signal stripline transmission line of one-quarter wavelength of the signals to be transceived, formed upon the same third ceramic substrate, the first ground plane opposite the control-signal stripline transmission line and the second ground plane opposite the control-signal stripline transmission line coupled to said transmitter circuit path for applying the control signal to the transmitter circuit path to cause the transmitter circuit path to form a short circuit to connect electrically the transmitter circuitry and the transceiver antenna and also to cause the shunt path to form a portion of said receiver circuit path, thereby to disconnect electrically the receiver circuitry from the transceiver antenna only during times when the control signal is above a first signal level and, otherwise, to cause the transmitter circuit path to form an open circuit to disconnect electrically the transmitter circuitry from the transceiver antenna and also to disconnect the shunt path from the receiver circuit path, thereby to connect electrically the receiver circuitry and the transceiver antenna.

* * * * *

UNITED STATES PATENT AND TRADEMARK OFFICE
CERTIFICATE OF CORRECTION

PATENT NO. : 5,513,382
DATED : April 30, 1996
INVENTOR(S) : Agahi-Kesheh et al.

It is certified that error appears in the above-indentified patent and that said Letters Patent is hereby corrected as shown below:

Claim 8
At column 13, line 31, please replace "the switch circuit of claim 8" with --the switch circuit of claim 7--.

Claim 9
At column 13, line 35, please replace "claim I" with --claim 1--.

Claim 11
At column 13, line 43, please replace both occurrences of the word "circuit" with --circuitry--.

Signed and Sealed this

Twenty-ninth Day of October 1996

Attest:

BRUCE LEHMAN

Attesting Officer     Commissioner of Patents and Trademarks